3,386,889
NEOMYCIN FERMENTATION MEDIA AND PROCESS

William Moses, Haworth, and Frederick A. Censullo, Lyndhurst, N.J., assignors, by mesne assignments, to Corn Products Company, New York, N.Y., a corporation of Delaware
No Drawing. Filed June 12, 1964, Ser. No. 374,842
10 Claims. (Cl. 195—114)

This invention relates to fermentation media and more particularly to special media for the fermentation of neomycin.

Neomycin is an important antibiotic for use in therapy and for certain industrial applications. Neomycin is elaborated by certain organisms of the Streptomyces genus when grown in culture media containing assimilable carbohydrates, proteins and inorganic salts. The broad requirements for such fermentation media are discussed by Waksmann et al. in U.S. Patent 2,799,620. A specific neomycin fermentation medium is disclosed in U.S. Patent 2,957,810 issued Oct. 25, 1960, wherein concentrations of neomycin in the range 6,000 units of neomycin base per milliliter of medium is achieved. This medium consists of combinations of readily assimilable carbohydrates, slowly assimilable polysaccharides and balancing amounts of protein from soybean meal.

In general, it has been found that the amount of carbohydrate in the medium limits the yield of neomycin that can be harvested from such a medium. As the amounts of carbohydrates are increased, the viscosity of the medium increases proportionately. Beyond 7% concentration of starches, the cheapest source, the medium becomes a semisolid gel and inordinate amounts of power are required to affect suitable agitation in such medium. Further, as the viscosity of the medium increases, heat transfer by convection is limited and it is difficult to sterilize such media prior to seeding with the culture organism. Another drawback with such highly concentrated media, since they are primarily used in deep fermentation processes, is the extreme difficulty of aerating these large tanks of viscous material without excessive bubbling and large volumes of entrapped gases within the medium. The aeration in such viscous media is extremely inefficient and the volume of the fermentation vessels is poorly utilized.

It is an object of this invention to provide neomycin fermentation media that can be fermented to yield high concentrations of neomycin.

Our invention is based on the discovery that it is possible to ferment neomycin in a medium wherein starch is the major or only source of assimilable carbohydrate and where the starch is present in amounts in excess of 7% by weight. To effect the object of this invention, the starch is altered by the action of a specific group of heat-stable rapid acting alpha-amylases which reduce the viscosity of the starch suspension and solubilize the starch without degrading it to mono- and disaccharides.

Any of the commercial starches may be used in the practice of this invention such as unmodified starches including tapioca starch, potato starch, corn starch, degerminated corn meal, amioca, wheat starch, sago starch, rice and rice starch. Starches which have been modified from their natural states may be used also; these include "thin-boiling starchy" carboxymethyl starches, acid-resistant starches and dextrines. Gums may also be used as total or partial sources of carbohydrates for this fermentation. Other non-carbohydrate sources for some of the carbon for the fermentation medium may be fats such as lard oil. These are often useful in small amounts since they help to control frothing during aeration of the fermentation medium.

In general, the source of protein and the amount of protein present in the medium is not critical provided that this amount does not become a limiting factor in the metabolism of the fermentation organism. We have found that the amount of protein may range between 30% by weight of the amount of carbohydrate to an amount equal or exceeding the weight of the carbohydrate present in the medium. As much as 25% of the amount of protein nitrogen necessary for the fermentation may be replaced by inorganic or organic nitrogen of a non-protein nature. Organic non-protein nitrogen sources may be derived from urea or from suitable amines and amides. Inorganic nitrogen may be derived from nitrates and ammonium salts. Among the protein sources may be mentioned: Distiller's solubles, brewer's yeast, beef extracts, soya protein, soya peptone, casein, casein hydrolyzates, fish meal, and the various meat-packing and fish-packing protein-containing residues. Another useful source of protein is corn steep-liquor concentrates.

The inorganic salts which are useful for the media other than ammonium salts and nitrates mentioned as nitrogen sources are chlorides, sulfates, phosphates and carbonates and the various metal ions which are needed for microbial growth such as calcium, potassium, magnesium and the trace metals including cobalt, iron, zinc and molybdenum.

The enzymes which are the crucial ingredient of this fermentation medium are preferably those rapid acting heat-stable alpha-amylases which convert the starch to soluble polysaccharides during its gelatinization stage. The gelatinization stage is that stage at which the starch grains hydrate and swell with water to form the typical viscous starch gels. The enzymes useful in the practice of this invention hydrolyze the starch gel before the gelatinization stage is completed so that the medium never becomes the viscous semisolid gel that is so typical of hydrated starch suspensions containing more than 7% by weight of starch. These enzymes are the group of bacterially derived alpha-amylases offered commercially by Wallerstein Laboratories under the name of "Rapidase"; by Rohm and Haas under the name Rhozyme H–39; by Miles Chemical Company under the name Takaminase HT–44 and 440 and which are sold in Europe by Novo Industri A/S as Bacterial Amylase Novo and under the trademarks Termozym and Aquazym. These enzymes are all active in the operative pH ranges of 5–8 and to temperatures up to 95° C. They are most active in the range of temperatures between 50° C. and 80° C. These enzymes have been found to convert starch suspensions without complete gelatinization to a soluble form during the time it takes to raise the temperature of the suspensions contained in fermentation vessels to the sterilization temperatures normally used for sterilizing the medium prior to inoculation.

The present invention specifically favors the use of rapid acting heat-stable, starch-liquifying alpha amylases from bacterial, fungal, animal or cereal sources. The other amylases appear to require a completely gelatinizated starch substrate. This is the condition that we would avoid by the use of the rapid-acting alpha-amylase. An additional advantage of the preferred bacterial-derived alpha-amylases is that they have a good heat stability and that they continue their activity in the media as it is heated for sterilization, i.e. raised to a point wherein all microbial action is eliminated prior to the inoculation with the desired neomycin-generating organism.

We have also found that the use of these alpha-amylases prevents the breakdown of the medium to substantial amounts of sugars such as maltose, glucose and other sugars. We have found that such mono- and disaccharides when present in substantial quantities tend to affect the color of the neomycin obtained. The neomycin tends to be tan-colored rather than white. Yields of neomycin in our modified starch media are lower in the presence of substantial amounts of sugars, i.e. more than 1%.

The pH of the medium should be in the range of 4-9. The preferred alpha-amylases of this invention appear to function most rapidly and with the greatest efficiency in this range. They have a maximum activity in the range of 5.0-8.0. Post sterilization, when the enzyme is destroyed, the pH of the medium should be within this range.

The amount of enzyme required appears to be noncritical as long as there is at least 0.01% by weight of enzyme present based on the weight of the starch carbohydrate. The optimum amount appears to be dependent to some degree on the surface of the vessels exposed to the medium. In shake-flasks, we have found that good yields are achieved when there is approximately 0.2% of enzyme present. In 60 and 600 gallon fermentors, less enzyme is required and 0.1% is adequate to achieve good yields. In the case of much larger vessels, i.e. in the range of 10,000 to 50,000 gallons, we have found that good yields are obtained when the concentration of the enzymes are in the range of 0.02 and 0.04% of the weight of the starch which ranges from 7-14% of the batch weight. As little as 0.01% based on starch weight is sufficient to solubilize as much as 11% of potato starch or degerminated corn meal.

Alpha-amylase is distinguished from beta-amylase which hydrolyzes gelatinized starches to mono- and di-saccharide sugars such as sucrose, maltose, glucose, fructose and lactose. The alpha-amylases, although rapid acting, do not break down the complex polysaccharides to sugars in any appreciable amount (less than 1%) but only to smaller chain units that are water soluble and whose solutions have low viscosities.

Although the invention as specifically disclosed herein is directed to the use of alpha-amylase-modified starch as substantially to sole source of assimilable polysaccharide in the nutrient medium, in its generic aspects the invention is directed to the method of increasing the yields of neomycin obtained by the submerged aerobic-fermentation of a neomycin-producing organism, ordinarily a fungi of the genus streptomyces, which comprises the fermentation in a fermentation medium substantially free from mono- and di-saccharides and initially containing more than 5% of an assimilable dextrin. The term "substantially free from mono- and di-saccharides" means less than 1%, preferably less than 0.5% and most desirably no more than 0.25%. The concentration of the assimilable dextrin, initially, is preferably at least 7% (calculated on the total liquid medium) and, more desirably, at least 9% (e.g., 11% or more). The assimilable dextrin can be acid- or enzyme-hydrolyzed starch, so long as the product is substantially free from mono-saccharides and di-saccharides. The combination of neglible amounts of mono- and di-saccharides and the high amount of dextrin results unexpectedly in greatly enhanced yields of neomycin. The yield of isolated neomycin is much higher as is the purity and otherwise better quality of neomycin when obtained by conventional isolation techniques.

The invention will be more specifically described in the appended examples which are intended to illustrate methods of operating within the scope of this invention with without in any way limiting any of the broader aspects or modifying the peculiar advantages derived by operating within its scope.

Example 1

A nutrient medium of the following composition was prepared:

| | Percent |
|---|---|
| Soya flour | 2 |
| Cotton seed protein | 1 |
| Corn gluten | 1 |
| Ammonium sulfate | 1 |
| Potato starch | 9 |
| Calcium carbonate | 1 |
| Bacterial alpha-amylase (Rapidase) | 0.2 |

This medium was mixed, subdivided into flasks and sterilized by boiling. By the time the medium had reached a temperature of 90 C., the entire amount of starch had been solubilized. At no time did the viscosity of the medium exceed the viscosities normally found with 5% concentrations of sugar (cerelose) media. Paper chromatography showed less than 1% sugars. After the medium was sterilized, it was inoculated with neomycin-producing organisms. The following table illustrates the effect of fermentation time on the potency of the fermentation broth expressed as micrograms of neomycin base per milliliter of medium.

| Time (hours): | Potency (mcgs. of base/ml.)[1] |
|---|---|
| 72 | 2,620 |
| 96 | 4,960 |
| 120 | 7,880 |
| 144 | 10,580 |
| 168 | 14,350 |

[1] All neomycin potency assays herein were by the procedure described in USP XVI pg. 863-864 (Cylinder Plate Method).

Example 2

Using the medium of Example 1 but varying the starch content resulted in the following neomycin broth-potencies at the end of 144 hours.

| Potato starch, percent (w./v.) | Broth potency (mcgs. base/ml.) |
|---|---|
| 5 | 7,600 |
| 7 | 9,000 |
| 9 | 11,000 |
| 11 | 10,700 |

As a control, the same media using 5% of sugar carbohydrates (cerelose), in the same time period, yielded a maximum broth potency of 5,000 micrograms per milliliter of base.

Example 3

A medium of Example 1 as duplicated but an alpha-amylase (Rhozyme-H-39) from another manufacturer was substituted. The yield and the rate of formation of neomycin were comparable to those obtained in Example 1.

Example 4

A nutrient medium of the following composition was prepared:

| Ingredients: | Percent w./v. |
|---|---|
| Milled corn meal (60-70% starch) | 11 |
| Soya flour | 2.5 |
| Brewer's yeast | 0.25 |
| CaCO$_3$ | 0.2 |
| Ammonium sulfate | 0.5 |
| Potassium salts (chlorides and phosphates) | 0.45 |
| Antifoam | 0.05 |
| Bacterial alpha-amylase | 0.1 |

The ingredients were combined with water in a 60 gallon fermentor and the medium was heated to sterilization temperatures by the introduction of live steam. The medium remained fluid and did not require any excess of power for stirring beyond the power normally required for mono- saccharide based media. The sterile medium was inoculated with a neomycin-producing organism. After 144 hours, the fermentation broth has a potency of 8,500 mcg./ml. A control medium based on a 5% maltose-polysaccharide according to U.S. Pat. 2,957,810 mixture as the carbohydrate source yielded only 4,500 mcg./ml.

Example 5

The medium of Example 4 was prepared. An additional 2% of glucose was added. This medium yielded only 4,200 mcg./ml. It appears that sugars interfere with the assimilation by the organism of the enzyme-altered starch products in its conversion of neomycin.

Example 6

A nutrient medium having the following composition was prepared:

| Ingredients: | Percent w./v. |
|---|---|
| Degerminated corn meal (starch content, 85–90%) | 11 |
| Soya flour | 2.5 |
| Brewer's yeast | 0.25 |
| $CaCO_3$ | 0.2 |
| Ammonium salts | 0.5 |
| Potassium salts | 0.45 |
| Antifoam | 0.05 |
| Bacterial alpha-amylase | 0.05 |

The medium was prepared in 600 gallon fermentor and sterilized by live steam. The sterile medium was inoculated with a neomycin-producing organism and fermented in the usual manner. At 144 hours the broth had a potency of 12,000 mcg./ml. The medium prepared according to the above formula but without the bacterial alpha-amylase could not be agitated by the available power in the stirring motor. Attempts to agitate and sterilize the control medium by live steam resulted in excess losses through frothing and bubbling in the fermentor. The addition of more antifoam did not sufficiently overcome this situation.

Example 7

The medium according to Example 6 but with bacterial alpha-amylase content reduced to 0.01% of the weight of the starch was prepared and sterilized in a 50,000 gallon fermentor. The medium was inoculated with the neomycin-producing organism. The yield at 144 hours was 12,500 mcg./ml.; i.e. within the range obtained in the smaller fermentor.

We claim:

1. A process for the production of neomycin which comprises cultivating a neomycin producing microorganism in a nutrient fermentation medium comprising essentially a nitrogen source, salts and at least 7% of starch as the source of carbohydrate, said starch having been modified by the action of an alpha-amylase, said alpha-amylase being present in said fermentation medium in a concentration of at least about 0.01% by weight of the starch in said medium.

2. The method according to claim 1 wherein the alpha-amylase is present to the extent of at least 0.01% by weight and less than 1% by weight of said starch contained in the medium.

3. The method according to claim 1 wherein the starch is modified by the alpha-amylase prior to the sterilization and subsequent inoculation of the medium with the neomycin-producing organism.

4. The process according to claim 1 wherein the alpha-amylase is a bacterial-derived alpha-amylase.

5. A process in accordance with claim 1 wherein the nutrient fermentation medium is prepared by suspending nitrogen sources, salts and starch in water, adding the alpha-amylase, maintaining said composition at a temperature below about 90° C. for a period of time sufficient to liquefy without completely gelatinizing said starch.

6. A process according to claim 1 wherein the nutrient fermentation medium is prepared by suspending nitrogen sources, salts and starch in water, introducing alpha-amylase, maintaining the resulting composition at a temperature below 90° C. for a period of time sufficient to liquefy said starch without completely gelatinizing the starch, raising the temperature of the liquefied mixture to a sterilizing temperature to destroy unwanted contaminants and to discontinue further enzymatic action by the alpha amylase.

7. A process according to claim 1 wherein the starch is corn meal.

8. A process according to claim 1 wherein the nutrient fermentation medium is substantially free from mono- and di-saccharides.

9. A process according to claim 1 wherein the nutrient fermentation medium contains less than about 1% by weight of mono- and di-saccharides.

10. A process according to claim 1 wherein the nutrient fermentation medium contains less than about 0.5% by weight of mono- and di-saccharides.

References Cited

UNITED STATES PATENTS

| 2,352,168 | 6/1944 | Christensen | 195—100 X |
| 2,431,004 | 11/1947 | Wickersham | 195—31 X |
| 2,609,330 | 9/1952 | Stanley | 195—100 |
| 2,647,854 | 8/1953 | Pflannmuller et al. | 195—31 |
| 2,957,810 | 10/1960 | Johnson et al. | 195—80 |

FOREIGN PATENTS

| 503,483 | 6/1954 | Canada. |

MAURICE W. GREENSTEIN, *Primary Examiner.*